United States Patent
Guo et al.

(10) Patent No.: US 9,852,220 B1
(45) Date of Patent: Dec. 26, 2017

(54) DISTRIBUTED WORKFLOW MANAGEMENT SYSTEM

(71) Applicant: Amazon Technologies, Inc., Reno, NV (US)

(72) Inventors: Jiaqi Guo, Seattle, WA (US); Baogang Song, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 124 days.

(21) Appl. No.: 13/647,294

(22) Filed: Oct. 8, 2012

(51) Int. Cl.
- G06F 7/00 (2006.01)
- G06F 17/00 (2006.01)
- G06F 17/30 (2006.01)

(52) U.S. Cl.
CPC .............. *G06F 17/30864* (2013.01)

(58) Field of Classification Search
USPC ......................................... 707/736
See application file for complete search history.

(56) References Cited

U.S. PATENT DOCUMENTS

| | | | |
|---|---|---|---|
| 2003/0149714 A1* | 8/2003 | Casati et al. .................. | 709/100 |
| 2005/0027585 A1* | 2/2005 | Wodtke .................. | G06Q 10/10 705/7.26 |
| 2005/0266926 A1* | 12/2005 | Kesselman ............. | A63F 13/12 463/42 |
| 2006/0241997 A1* | 10/2006 | Bhatawdekar ......... | G06Q 10/06 705/7.17 |
| 2007/0266368 A1* | 11/2007 | Szpak et al. .................. | 717/105 |
| 2008/0288464 A1* | 11/2008 | Facciorusso et al. ............ | 707/3 |
| 2010/0201691 A1* | 8/2010 | Li .......................... | G06T 13/00 345/473 |
| 2011/0246991 A1* | 10/2011 | Lu .......................... | G06Q 10/06 718/100 |
| 2012/0330954 A1* | 12/2012 | Sivasubramanian et al. ............................. | 707/737 |

\* cited by examiner

*Primary Examiner* — Muluemebet Gurmu
(74) *Attorney, Agent, or Firm* — Knobbe, Martens, Olson & Bear LLP

(57) ABSTRACT

A workflow management system having a queue service, a non-relational database, and a workflow engine. The queue service is configured to receive a task from a computing device. The non-relational database is configured to store data. The workflow engine has a workflow definition defining a plurality of operating states for an application. The workflow engine in communication with the queue service and the non-relational database, the workflow engine is configured to receive tasks from the queue service, query the non-relational database, receive query data from the non-relational database, and execute tasks based on task data, process data, and the workflow definition.

20 Claims, 6 Drawing Sheets

DISTRIBUTED WORKFLOW MANAGEMENT SYSTEM

BACKGROUND

Generally described, computing devices can utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

Computing systems within a data center may process workflows in order to perform various tasks or functions. Processing of these workflows may require access to computing resource either within or outside of the data center. Traditional development approaches in workflow management systems can be both time-consuming and costly. Workflow management systems often have difficulty identifying and tracking processing steps that run at different times and have different durations. In embodiments in which a workflow management system requires the execution of applications distributed across multiple computing systems, the coordination of workflow process steps across those systems presents an added challenge.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1A:
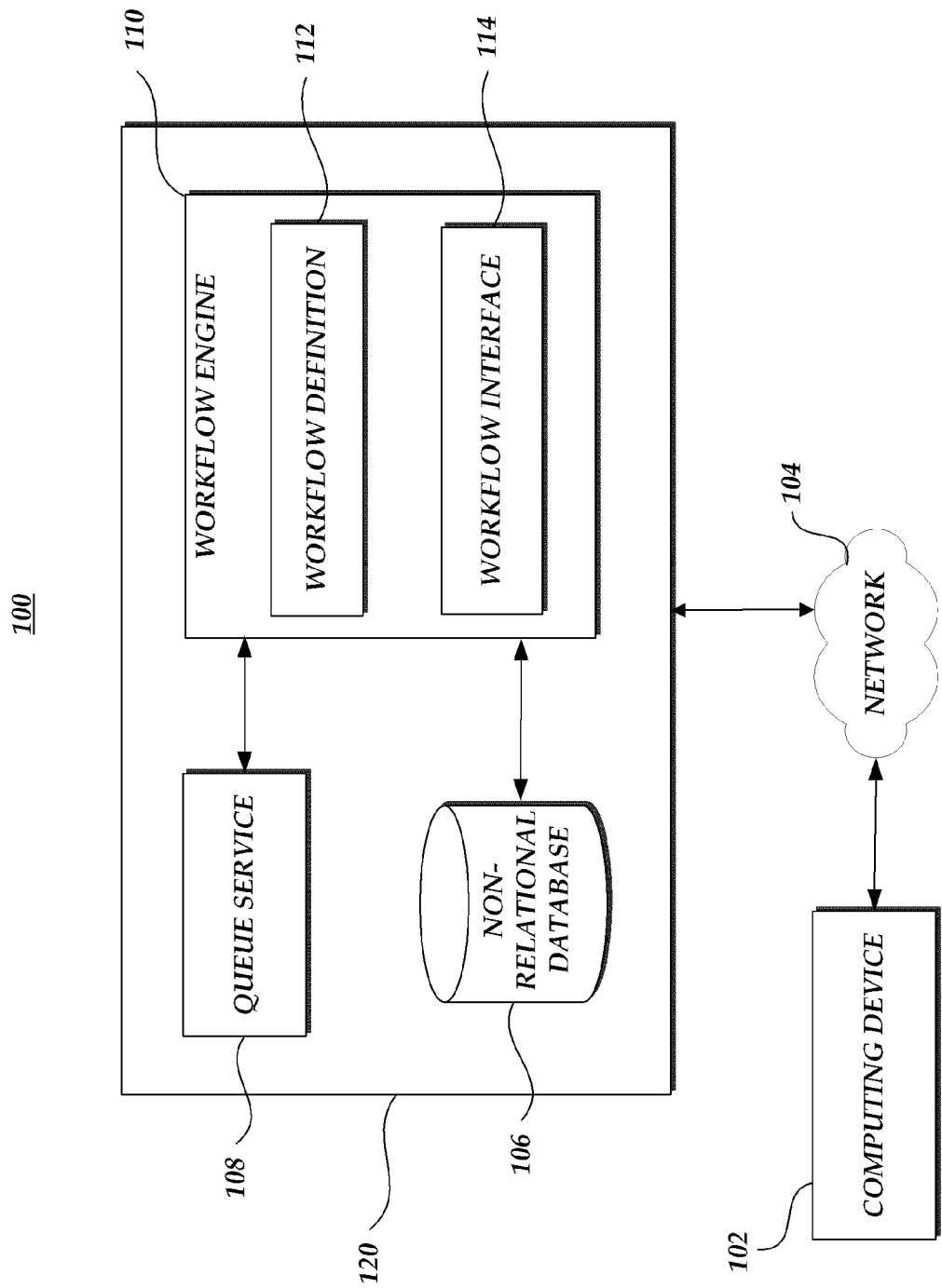
FIG. 1A is a block diagram depicting an illustrative embodiment of a computing environment implementing a distributed workflow engine.

FIG. 1A illustrates an embodiment of a computing environment 100 for a distributed workflow management system 120. In this embodiment, the distributed workflow management system 120 includes a workflow engine 110, a queue service 108, and a non-relational database 106. The workflow engine 110 has a workflow definition 112 and a workflow interface 114.

The workflow engine 110 coordinates the execution of processes within an application. Each application has a plurality of operating states. A workflow definition 112, also referred to as a state machine definition, defines each operating state using one or more state parameters and defines relationships between the states. For example a state can have one or more transitions to other states. A process initiated within the application transitions through operating states within the workflow definition 112 until the process is completed. The workflow engine 110 receives tasks for a process from the queue service 108. Each task is associated with a specific process and includes task data. The task data is stateless and does not contain information about the current operating state of the process. A process can execute one or more tasks at each state. The execution of each task is dependent upon the current operating state, also referred to as the state of execution, of the process. Specifically, the workflow engine 110 executes the task based on the state parameters of the current operating state. The non-relational database 106 stores data related to each process, or process data, such as the current operating state. The workflow engine 110 retrieves the process data from the non-relational database 106.

Extended processes can be problematic for some types of workflow systems to execute. For example, other types of workflow systems can use a process execution history to determine how to execute tasks within a process. The process execution history stores data from each previous operating state in the process. For each new task, the workflow engine reviews the process history in order to properly execute the new task. These systems can have an execution limit, which limits the total number of executions the system is capable of handling for each process. As processes reach the execution limit, the systems can experience problems such as degraded performance, failed processes, and other problems. A system could have an execution limit in the thousands or even hundreds of the thousands. However, a single process can extend multiple months in time and execute millions of tasks before completing.

Advantageously, the workflow system 120 in the present disclosure does not have an execution limit. The workflow system 120 does not use data collected from previous operating states to execute tasks. The workflow system only uses information relating to the current state to execute each task. As such the workflow system does not have an execution limitation for each process or a limitation on the length of a process. Additionally, the non-relational database 106 does not have a scaling limitation on the size of the database.

With continued reference to FIG. 1A, the workflow management system 120 is configured to communicate over a network 104 with one or more computing devices 102. The computing device 102 can perform interactions with the workflow system 120 such as initiating a process or a task. The workflow interface 114 provides an interface for the computing device 102 to interact with the workflow system. Each of the components within the workflow system 120 can be configured to communicate over the network. The workflow management system 120 can be implemented by one or more physical computing devices, such as servers. These servers can be physically co-located or can be geographically separate, for example, in different data centers.

The depicted environment 100 includes a computing device 102 communicatively connected by a network 104, such as the Internet. Those skilled in the art will recognize that the computing device 102 may be any of a number of computing devices that are capable of communicating over a network including, but not limited to, a data center server, workstation, laptop, personal computer, tablet computer, electronic book reader, personal digital assistant (PDA), hybrid PDA/mobile phone, mobile phone and the like. In some embodiments, the computing device 102 may include computer hardware and software components.

Those skilled in the art will appreciate that the network 104 may be any wired network, wireless network or combination thereof. In addition, the network 104 may be a personal area network, local area network, wide area network, cable network, satellite network, cellular telephone network, or combination thereof. Protocols and components for communicating via any of the other aforementioned types of communication networks are well known to those skilled in the art of computer communications and thus, need not be described in more detail herein.

The workflow definition 112 defines the operating states and transitions between operating states. Each operating state is further defined by one or more state parameters. The state parameters define how the operating state handles and processes tasks. For example the state parameters can define to which other states that the states can transition. Further the state parameters can determine how to process triggers, failure protocols and other information. Each operating state within the workflow definition 112 is sufficiently defined such that the workflow engine 110 can execute a stateless task based on the current state of execution, the state parameters, the task data, and process information provided by the non-relational database 106.

Illustratively, the queue service 108 corresponds to a message queuing service that enables asynchronous message-based communication between distributed components of the workflow system 120. The queue service 108 provides one or more queues that can process communications between computing devices 102 and the workflow system 120. The queue service can dynamically change the number of queues needed depending upon the number of messages that are being sent and received by the workflow system 120. In one aspect, the queue service 108 can be scaled to handle any number of messages by increasing the number of available queues to handle the number of messages that are received. In accordance with this aspect, the number of messages that can be sent to the queue service 108 at any time from components of the workflow management system 120 or computing devices 102 can vary. The queue service 108 processes messages sequentially, using a FIFO procedure. After the messages have been received by the queue service 108, the messages can be retrieved from the queue right away or at a later time. Messages can also be stored by the queue service 108 until the messages retrieved. Illustratively, multiple processes can read/write from/to the queue service 108 at the same time without interfering with each other. The queue service 108 can be implemented on one or more physical computing devices, such as servers.

In one embodiment the queue service 108 is used to pass tasks from a caller, such as a computing device 102, to a recipient, such as the workflow engine 110. The queue service 108 can pass tasks to the workflow engine 110 that instruct the workflow engine to go to a state, execute an action, or receive a signal.

In another aspect, the queue service 108 can be configured to guaranty delivery of messages from the caller to the recipient. In another aspect, the caller can specify a delay before the message becomes available to the recipient. The queue service 108 can be similar to queue services that are commercially available such as Amazon Simple Queue Service (SQS) and Apache ActiveMQ.

Non-relational database systems 106, also known as noSQL systems, are used to store, manage, and query structured data for the workflow system 120. The non-relational database 106 can assign a primary key to datasets and allows the workflow engine 110 to consistently read and write attributes with a given primary key. The data storage capacity of the non-relational database 106 can be scaled to meet the specific demands of the workflow management system 120.

Non-relational databases can be categorized according to the way that data is stored, such as key-value stores, BigTable implementations, document store databases, and graph databases. In one embodiment the non-relational database 106 can be a key-value store database. Key-value stores can be used to store millions of key-value pairs in one or a few associative arrays. Key-value stores allow the application to store its data in a schema-less way. The data can be stored in a data type of a programming language or an object. Because of this, there is no need for a fixed data model. Additionally, each data item can have a different number of attributes.

Illustratively, the non-relational database 106 can store data for each process that is executed or initiated by the workflow system 120. Illustratively, for each process, the non-relational database 106 can store data such as execution level information, state information, and received signals. In one aspect, the execution level information can include, a unique execution identifier, also known as a primary key, an execution start timestamp, a last state change timestamp, a sequence number, a locked flag indicating execution is locked by the workflow engine 110, and the like. In another aspect, the state information can include, the current state, input, failed action attempts, name of action attempted, number of failures, last failure timestamp, and the like. In a further aspect, the received signal data can include, the signal name, input of the signal, an expiration timestamp, sequence of execution when signal is received, and the like.

In some embodiments, the non-relational database 106 can create and manage multiple geographically distributed replicas of the data automatically to enable high availability and data durability. If a replica of the data fails, the non-relational database 106 can failover to another replica within the database. In some embodiments, the data can be automatically indexed. In some embodiments the non-relational database 106 can be encrypted and secured using available encryption and security protocols. In one embodiment the non-relational database 106 can have a database table that can store and retrieve any amount of data, and serve any level of request traffic. The non-relational database 106 can automatically spread the data and traffic for the table over a sufficient number of servers to handle the request capacity and the amount of data stored.

Figure 1B:
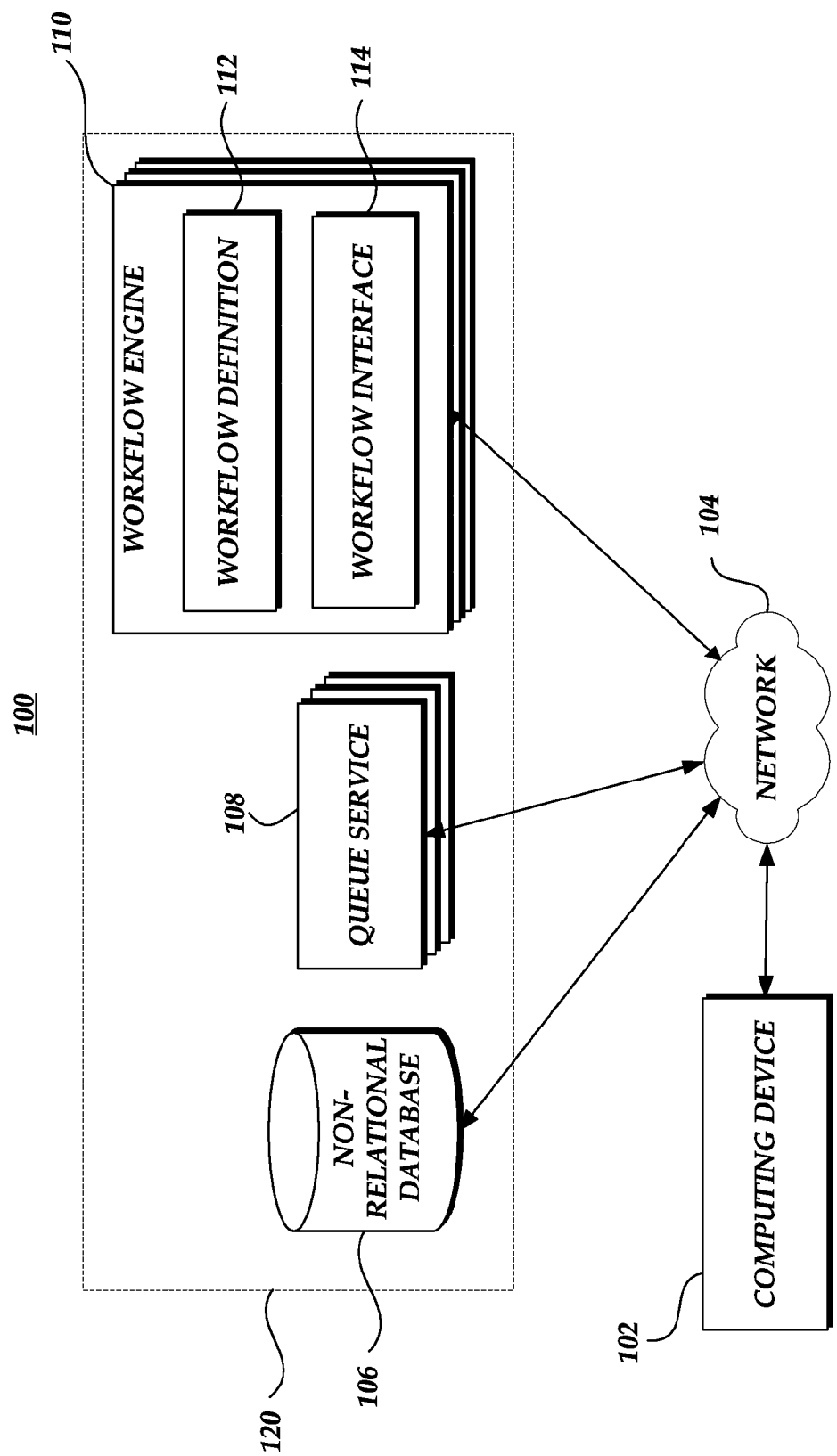
FIG. 1B is a block diagram depicting another illustrative embodiment of a computing environment implementing a distributed workflow engine.

FIG. 1B illustrates and example of a computing environment where the workflow management system 120 is using a distributed network-based architecture. The queue service 208, non-relational database 106, and workflow engine communicate via the network 104. Multiple instances of the workflow engine 110 and the queue service 108 can be run simultaneously.

Illustratively, in one embodiment the workflow engine 110 can be a web service that provides resizable compute capacity in a network-based architecture. The workflow engine 110 can be used to build applications that are configured to scale from smaller to larger as required by demands of the application. In one embodiment the workflow engine 110 can dynamically increase or decrease capacity within a short amount of time, such as a few minutes. The workflow engine 110 can commission one, hundreds, or even thousands of server instances simultaneously. In some embodiments, a web service API can be used to control the scaling of instances.

Illustratively, the queue service 108 can also be implemented on a network-based architecture in which one or more network-based computing devices, including physical computing devices or virtualized computing devices, running a plurality of instances of the queue service 108.

In some network-based embodiments the non-relational database 106 can dynamically allocate additional resources to the workflow engine 110 to meet performance requirements of the workflow system 120, and automatically partition data over a sufficient number of servers to meet storage capacity. In some embodiments, data in the non-relational database 106 can be stored and queried via web services requests.

Figure 2:
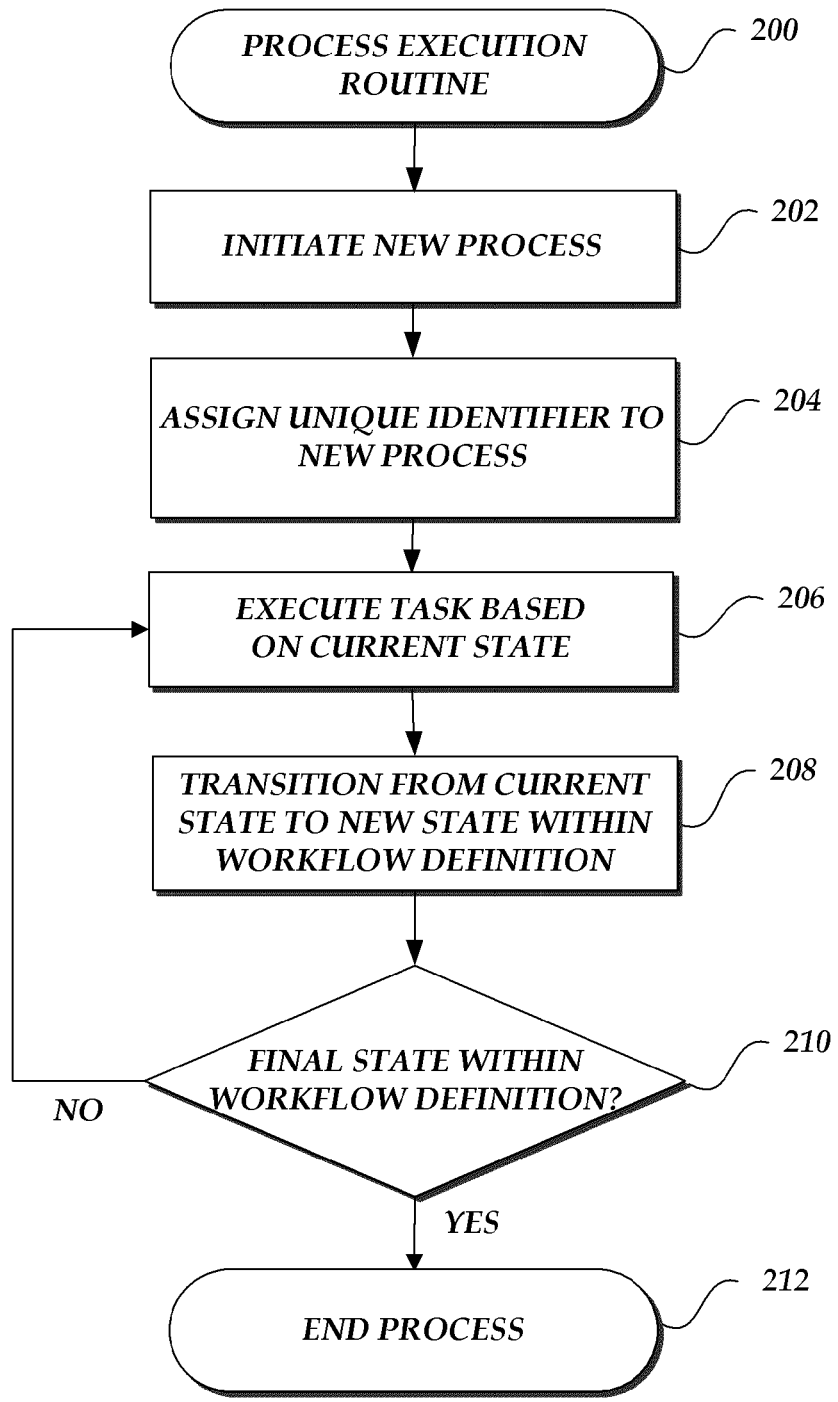
FIG. 2 is a flow diagram depicting an illustrative routine for the execution of a process.

FIG. 2 is a flow diagram depicting an illustrative routine 200 for executing a process within the workflow management system 120. One skilled in the relevant art will appreciate that actions/steps outlined for routine 200 may be implemented by one or many computing devices/components that are associated with workflow system 120. Accordingly, the routine 200 has been logically associated as being generally performed by the workflow engine 110, and thus the following illustrative embodiments would not be considered as limiting.

The process execution routine starts at block 202 when a new process is initiated. A new process can be initiated by a caller, such as a computing device 102. The new process can be automated by a computing device 102, manually initiated by a user, or initiated in another way.

When the new process is initiated, at block 204, a unique identifier is assigned to the new process. The unique identifier, such as a primary key, uniquely corresponds to the initiated process. A new dataset corresponding to the new process is created within the non-relational database 106. Each new process has its own dataset with a unique identifier within the non-relational database 106. In some embodiments the non-relational database 106 uses a key-value store database. As the number of processes increases the non-relational database can be scaled accordingly. Additional processes can be initiated as long as sufficient storage is allocated to the non-relational database 106. The non-relational database 106 can be operated in a distributed computing environment using a network-based architecture. In some embodiments multiple processes can be initiated simultaneously. In such embodiments, multiple instances of components within the workflow system 120 can be implemented to handle each new process.

At block 206, a task is executed within the process. The task is provided by a computing device 102 to the queue system 108. The queue system 108 provides the task to the workflow engine 110. The task has associated task data that is communicated with the task. The task data includes the unique identifier associated with the process. The workflow engine 110 retrieves data, such as the current operating state of the process, from the non-relational database 106 based on the unique identifier provided by the task. The workflow engine 110 executes the task based on the task data, the current operating state of the process, the workflow definition 112, and process data retrieved from the non-relational database 106. The task is executed without consideration of the process execution history. In one aspect the task data instructs the workflow engine 110 to transition to another operating state. In another aspect the task data instructs the workflow engine 110 to execute an action. In another aspect the task data instructs the workflow engine 110 to receive a signal. The task execution process is described in additional detail with reference to FIGS. 3 and 4.

At block 208, based on the execution of the task, the process can transition from the current operating state to a new operating state within the workflow definition. The execution of a task can prompts the workflow engine 110 to implement a transition from the current state to a new state, either directly or indirectly. For example in a photo processing application a user can upload photo for printing. Prior to printing the photos, the user can have an editing state where various editing options, such as cropping the photo, removing red eye, adjusting saturation, balance, and other adjustments. When the user performs a task, the specific task can prompt a transition from the current state to another state. If the user decides to print a photo, the process transitions to a print state. If the user decides to crop a photo, the system can automatically transition back to the editing state after performing a cropping action.

At block 210 the workflow engine determines whether the new operating state is the final state in the workflow definition. If the new operating state is the final state in the workflow definition then the workflow proceeds to block 212 and terminates the process.

If the new state is not the final state then the workflow engine 110 returns to block 306 and continues to perform task executions until the process reaches the final state and ends the process at block 312. Each process can last for an indeterminate amount of time, which can be seconds, minutes, hours, days, months, and so forth. For longer processes, there can be millions of task executions. When the process execution history of a process is used to determine the next state of execution, long processes could significantly hamper performance of the workflow system 120 and ultimately cause the process execution to fail. By not relying on the execution history, the workflow system 120 is free from limitations on the length of execution and the number of events within each execution. Additionally, there is not a scalability limitation associated with non-relational databases.

Figure 3:
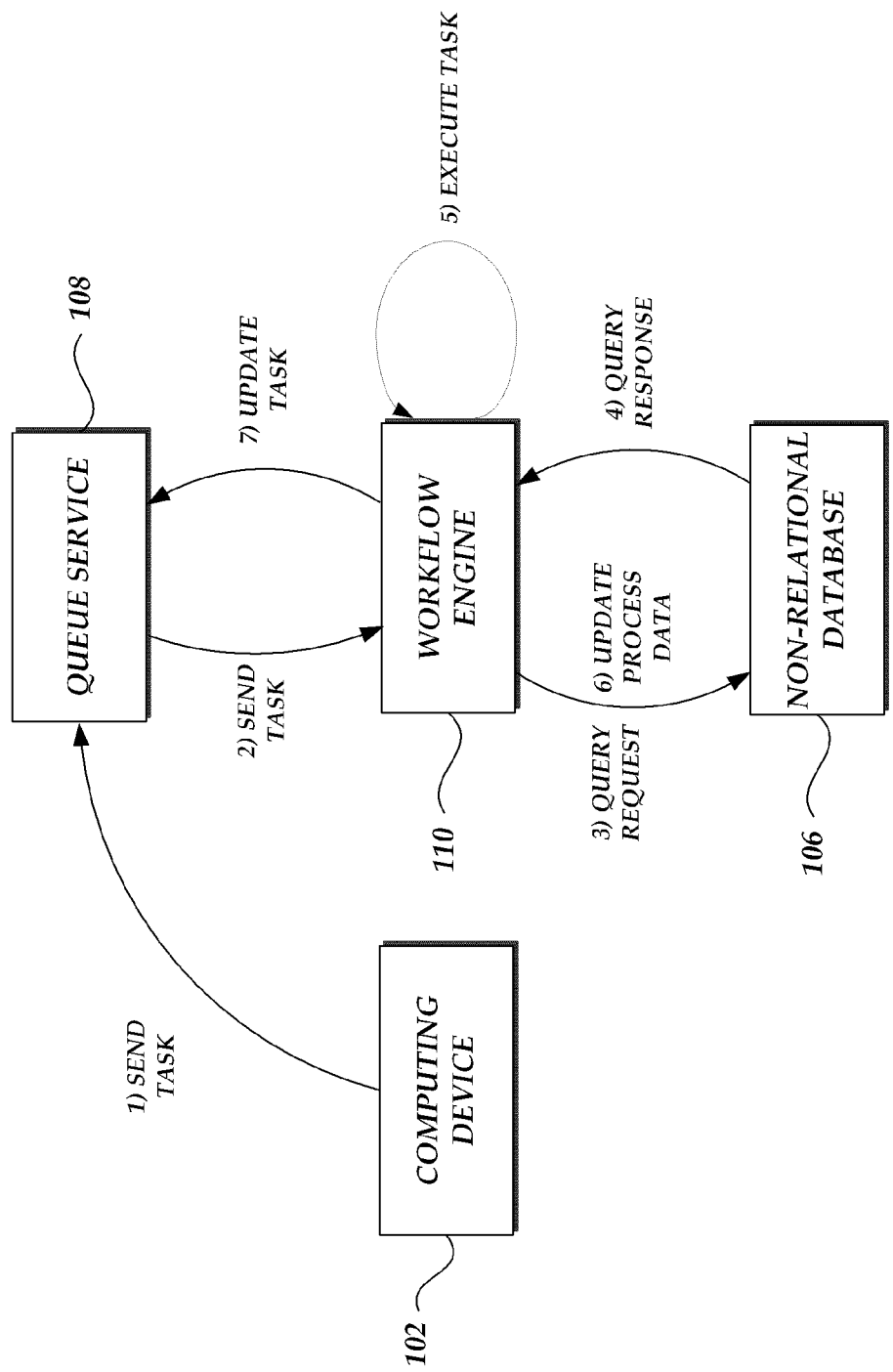
FIG. 3 is a block diagram illustrating the execution of a task by the distributed workflow system.

With reference now to FIG. 3, a block diagram illustrating the runtime execution of a task by the distributed workflow management system 120 is provided. Each task execution event follows substantially the same execution routine. The workflow system 120 can have multiple task executions and multiple processes running simultaneously. In some embodiments, such as the operating environment illustrated in FIG. 1B, execution of tasks can be distributed about one or more instances of the workflow engine 110. For example a first task can be implemented on one instance of the workflow engine 110 and a second task occurring later in time can be implemented on another instance. In some embodiments the tasks can be implemented by the same processing components.

As illustrated in FIG. 3, at (1), a computing device 102 sends a task to the workflow system 120. The task is received by the queue service 108. The task can be sent by a user from the computing device 102. In some instances an automated task can be sent to the queue service 108 by a computing device 102. Each task has associated task data, including a unique identifier, such as a primary key associated with the task. The primary key correlates the task with a unique process. The task is sent from the computing device to the workflow system 120. In some embodiments the task can be sent directly to the queue service 108.

In one aspect the task is a command to transition the process from one operating state to another operating state.

In another aspect the task is a command to execute an action. In yet another aspect the task is a signal. The workflow engine 110 can be configured to accept and process other types of tasks.

At (2), the queue service 108 sends the task to the workflow engine 110. The queue service 108 processes tasks sequentially, following a FIFO procedure. The tasks can include a time delay that instructs the queue service 108 to delay sending the task to the workflow engine 110. In some embodiments, the queue service 108 can have one or more instances of a queue for each process, so that the each process can receive tasks from the computing devices 102 in parallel. For example, if four processes are occurring simultaneously, the queue service 108 could create four queues for receiving and sending tasks in parallel. In some instances the queue service can send tasks to multiple instances of the workflow engine 110. Processes can be performed in parallel; however, tasks within each process are performed sequentially. The queue service 108 can queue up sequential tasks and provide the workflow engine 110 with a new task each time the previous task is done being processed.

At (3) the workflow engine 110 sends a query request to the non-relational database 106. The query request is based at least in part on the task data provided by the task 108. Specifically, the task has a unique identifier, such as a primary key, which associates the task with a unique process. The workflow engine 110 uses the primary key and the task data to generate a query request that requests process data from the non-relational database 106. In some instances the query request can requests all of the process data associated with the primary key. In other instances the query request is only for a portion of the process data associated with the primary key. The query requests are structured using the specific API and commands associated with the non-relational database 106. The types of queries and responses that can be implemented are based on the specific implementation of the non-relational database. After the query request is generated and sent from the workflow engine 110 to the non-relational database 106, the non relational database 106 responds.

At (4) the non relational database 106 sends a query response to the workflow engine 110. The query response provides the process data associated with the primary key back to the workflow engine 110. As stated above the process data stored for each process can vary depending on the specific implementation of the workflow management system 120. Illustratively, the process data stored in the non-relational database 106 can include execution level information, state information, and received signals. In one aspect, the execution level information can include, a unique execution identifier, also known as a primary key, an execution start timestamp, a last state change timestamp, a sequence number, a locked flag indicating execution is locked by the workflow engine 110, and the like. In another aspect, the state information can include, the current state, input, failed action attempts, name of action attempted, number of failures, last failure timestamp, and the like. In a further aspect, the received signal data can include, the signal name, input of the signal, an expiration timestamp, sequence of execution when signal is received, and the like.

At (5) the workflow engine 110 executes the task. In some embodiments, prior to executing the task, the workflow engine 110 sets a lock flag for the process. The workflow engine 110 will not proceed with the execution of the task until the lock flag has been set. Once the lock flag is set the workflow engine 110 will not process additional tasks for the process until the lock flag has been removed. This ensures that no tasks are received and processed from the queue service by the workflow engine 110 while the workflow engine 110 is processing another task.

The workflow engine 110 executes the task based on the task data, the process data, the workflow definition 112. Among other data, the process data includes the current operating state of the process. Based on the current operating state, the workflow engine 110 uses the workflow definition 112 to determine how to process and execute the task.

Illustratively, the tasks can instruct the workflow engine 110 to transition to another operating state, execute an action, or receive a signal. In one aspect, the task changes the current operating state to another operating state. In another aspect, the execution of an action can also prompt the workflow engine 110 to change the current operating state. When executing an action, if the action fails, a failure strategy can be implemented to handle the failure. If the action succeeds, the workflow engine can perform the action, which can also prompt a transition to a new state. In some instances, the failure strategy can also prompt the transition of the process to a new operating state. Illustratively, an action can represent any instruction or command that is defined by the workflow definition. For example, in a photo processing application this could include uploading a photo, editing a photo, deleting a photo, or any other action or command implemented by the application.

In another aspect, when the workflow engine 110 receives a signal, the workflow engine 110 can determine whether the signal matches a signal trigger. To the extent that the signal matches a signal trigger, the process can be transition to a new state, perform a specific action, or implement another command. In one instance, a caller can send a signal to the workflow engine 110. The workflow engine 110 can process the signal and generate a task based on the signal. The task can be sent from the workflow engine 110 to the queue service 108 and processed as standard task. For example, an application can receive a signal that a document has been uploaded. The workflow engine 110 can process the signal and generate a task to approve the document that has been uploaded. The approve document task is transferred from the workflow engine 110 to the queue service 108. The workflow engine can then execute the approve document task, which, when executed, could change the document state from pending to approved.

At (6), the workflow engine 110 updates the process dataset associated with the primary key within the non-relational database 106. The process data is updated based on the specific execution of the task. For example, when the process transitions to a new operating state, the data associated with the previous state is cleared and updated with new state information. The previous state data is removed from the dataset. In some embodiments, the non-relational database 106 can be configured to maintain a history of the executions within for process such as a log file. The history is not used by the workflow engine 110 for the execution of subsequent tasks.

After the task is executed, the lock flag is removed from the process and the queue service 108 can continue to provide task information for the process to the workflow engine 110.

At (7), the workflow engine 110 can update or generate a task for the queue service 108. The workflow engine 110 can generate a new task based on the execution of the task at (5). The new task is sent to the queue service. In some instances the workflow engine can provide a new task to the queue service 108 and in other instances the workflow engine can update an existing task in the queue service 108. The queue service 108 processes the new or updated task in the same manner as described above at (2). In some instances the workflow engine does not provide an updated or new task to the queue service 108, such as when the process has reached the final state.

Figure 4:
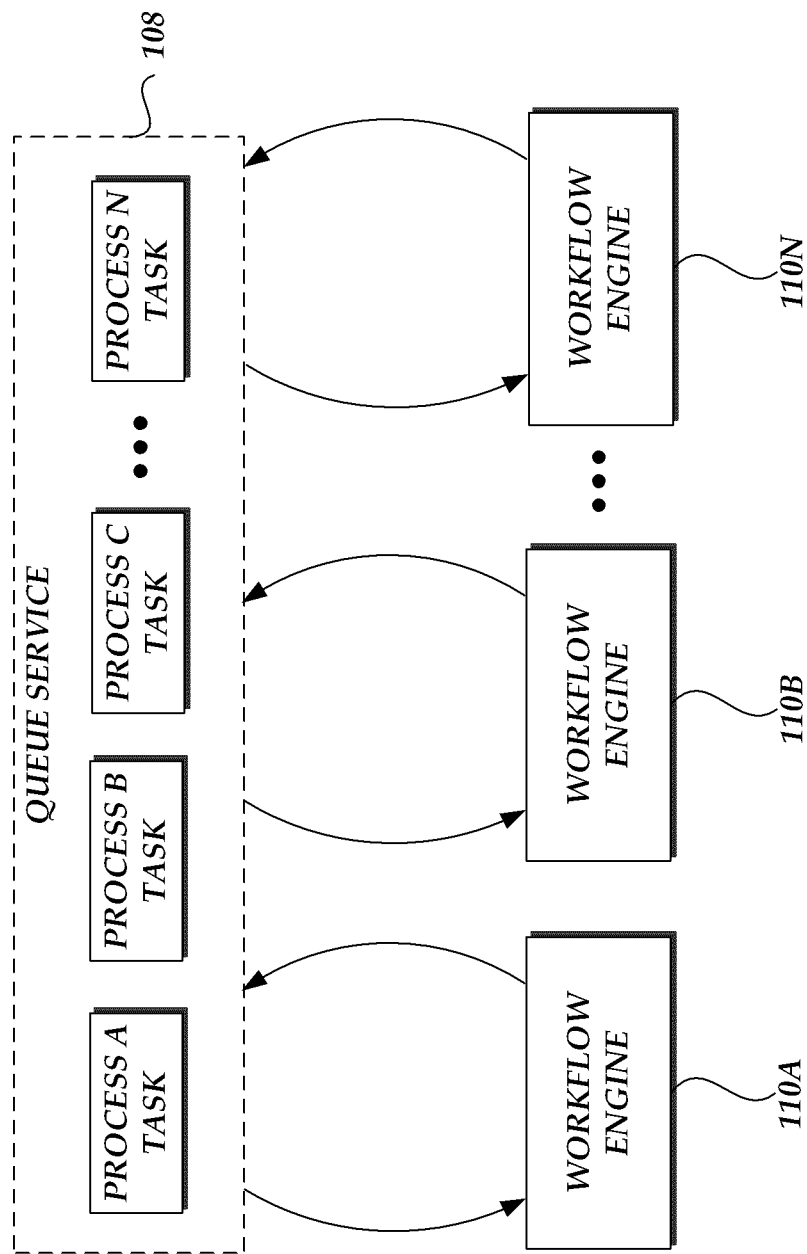
FIG. 4 depicts an illustrative embodiment of communication between a queue service and a workflow engine.

FIG. 4 illustrates an embodiment of the communication between the queue service 108 and the workflow engine 110. In this embodiment the workflow engine 110 and queue service 108 perform the same functions and processes as described in relation to FIG. 3. In this embodiment, the workflow system 120 has tasks for processes A through N distributed on one or more queues within the queue service 108. In one instance the queue service 108 generates a queue for each process, where only the tasks for the specific process are placed within the queue. In another instance tasks from a plurality of processes are placed within the same queue. The queue service 108 is scalable and can account for any number of processes and tasks that are being processed by the workflow system 120. In one embodiment the queue service can dynamically creates additional instances of the queue service 108 to account for additional processes and or tasks that the workflow system 120 is processing.

The workflow engines 110A-N retrieve tasks from the queue service 108. Each workflow engine 110 executes tasks retrieved from the queue service 108 as discussed above with reference to FIG. 3 and discussed below with reference to FIG. 5. Each workflow engine 110 can retrieve tasks related to any process. For example workflow engine 110A can process a task from Process A, Process B, and Process C. The workflow engines are not dedicated to a single process but continue to process tasks as they become available from the queue service 108. As such, the execution of any process is not tied to a single workflow engine 110. Advantageously, the number of workflow engines can be increased or decreased to account for changes in workload. As workload demands decrease, fewer workflow engines 110 can be allocated to the workflow system 120. As workload demands increase, additional workflow engines can be added to the workflow system 120. Due to the distributed and iterative nature of the workflow system, the workflow engines 110 can be continually scaled to account for workload and system requirements.

Additionally, if there is a malfunction or failure of one or more workflow engines 110, the workflow engines 110 can be replaced as needed. Advantageously this provides improved fault tolerance for each process, as each workflow engine 110 is iteratively associated with only a single task from a process at any given time. As such, failure of a workflow engine 110 during the execution of a task does not necessarily require the termination of a process.

Figure 5:
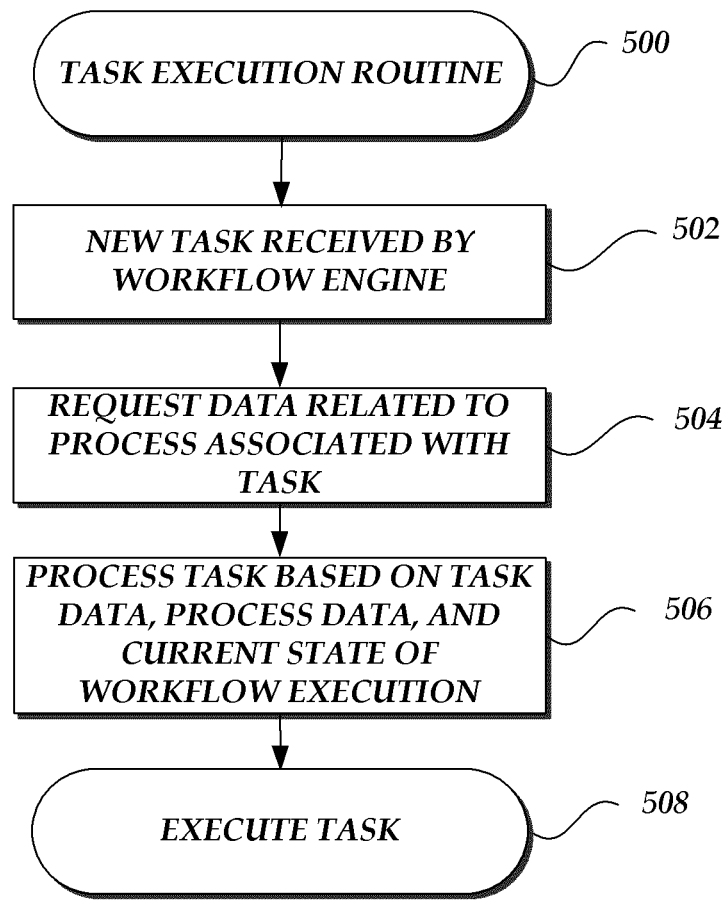
FIG. 5 is a flow diagram depicting an illustrative routine for the execution of a task.

FIG. 5 is a flow diagram depicting an illustrative routine 500 for a task execution within the workflow management system 120. One skilled in the relevant art will appreciate that actions/steps outlined for routine 500 may be implemented by one or many computing devices/components that are associated with workflow engine 110. Accordingly, the routine 500 has been logically associated as being generally performed workflow engine 110, and thus the following illustrative embodiments would not be considered as limiting.

At block 502 a new task is received by the workflow engine 110. The task received by the workflow engine 110 has task data including a unique identifier. The unique identifier associates the task with a unique process. The task can be received from a queue service 108. The task can be stateless, such that it does not provide information relating to the current operating state of the associated process.

At block 504, the workflow engine 110 requests process data related to unique identifier. The workflow engine 110 generates a query for the non-relational database 106. The query is based at least in part on the unique identifier. In response to the query, the workflow engine 110 receives a query response from the non-relational database 106. The query response provides process data relating to the process associated with the unique identifier to the workflow engine 110. In one embodiment, the data provided by the non-relational database 106 can include execution level information, state information, and received signals. In one aspect, the state information provides the current operating state of the process associated with the unique identifier.

At block 506, the workflow engine processes the task based on the task data, the process data, the current operating state of the process, and the workflow definition. Based on the current state of the process execution, the workflow engine 110 uses the workflow definition 112 to determine how to process the task data.

At block 508, the workflow engine executes the task. In one embodiment the tasks can instruct the workflow engine 110 to transition to another operating state, execute an action, or receive a signal. In one aspect, the task changes the current operating state to another operating state. In another aspect, the execution of an action can also prompt the workflow engine 110 to change the current operating state. When executing an action, if the action fails, a failure strategy can be implemented to handle the failure. If the action succeeds, the workflow engine can perform the action, which can also prompt a transition to a new state. In some instances, the failure strategy can also prompt the transition of the process to a new operating state. In another aspect, when the workflow engine 110 receives a signal, the workflow engine 110 can determine whether the signal matches a signal trigger. To the extent that the signal matches a signal trigger, the process can be transition to a new state, perform a specific action, or implement another command.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for distributed workflow management by a workflow management system, the method comprising:
   creating a workflow definition for execution by a workflow engine, wherein the workflow definition defines a plurality of operating states for a workflow process, wherein each operating state has one or more state parameters;
   generating a plurality of instances of the workflow engine during runtime of the workflow management system;
   generating at least one queue of a queue service during runtime of the workflow management system;
   dynamically adjusting the number of instances of the workflow engine and the number of queues of the queue service based on a change in a workload demand of the workflow management system, the workflow demand based, at least in part, on a number of workflow processes executing within the workflow management system, wherein each workflow process includes one or more tasks;
   for each task, by one of the plurality of instances of the workflow engine:
   retrieving a task from a queue of the queue service, wherein the task includes a unique identifier associated with one of the workflow processes;
   sending a query request to a non-relational database based, at least in part, on the unique identifier;
   receiving a query response from the non-relational database, wherein the query response identifies a current operating state of the workflow process;
   executing the task independent of an execution history of the workflow process, wherein the task is executed based on the task, the query response, the current operating state of the process, and the workflow definition; and
   updating the non-relational database with a new operating state of the workflow process and removing operating state data associated with the previously executed task.

2. The method of claim 1 further comprising setting a lock flag prior to executing the task; and
   removing the lock flag after executing the task.

3. The method of claim 1 further comprising initiating a new process and assigning a second unique identifier to the new process.

4. The method of claim 1, wherein the workflow definition is deterministic.

5. The method of claim 1, wherein the unique identifier is a primary key.

6. A system for workflow management, the system comprising:
   a queue service comprising at least one queue configured to receive a task from a computing device, wherein the queue service is configured to dynamically adjust the number of queues based, at least in part, on the workload demand of the workflow management system;
   a non-relational database configured to store data; and
   a plurality of instances of a workflow engine, each instance of the workflow engine configured to execute a workflow definition, the workflow definition defining a plurality of states and transitions of a workflow process, the plurality of instances of the workflow engine in communication with the queue service and the non-relational database, wherein the number of instances of the workflow engine are dynamically adjusted during runtime of the workflow management system based, at least in part on a workload demand, the workload demand based, at least in part, on a number of workflow processes executing within the workflow management system, wherein individual instances of the workflow engine are configured with computer-executable instructions that when executed by one or more processors are configured to:
   receive the task from the queue service;
   query the non-relational database;
   receive process data from the non-relational database;
   execute a task based on the process data, a current state of the process, and the workflow definition independent of the execution history of the process, wherein the task transitions the process from the current state of the process to a new state of the process;
   update the process data from the non-relational database to include the new state of the process and remove previous operating state data associated with the executed task.

7. The system of claim 6, wherein each task is associated with a unique process.

8. The system of claim 6, wherein the non-relational database stores execution level information, state information, and received signals for each process.

9. The system of claim 6, wherein the plurality of instances of the workflow engine execute tasks for different processes in parallel.

10. The system of claim 6, wherein the workflow engine, the queue system, and non-relational database are network-based.

11. The system of claim 6, wherein the non-relational database is a key-value store database.

12. The system of claim 6, wherein the non-relational database is distributed on a plurality of servers.

13. The system of claim 6, wherein the non-relational database is schema-less.

14. The system of claim 6, wherein the process data includes a current state of the process.

15. A non-transitory computer readable medium comprising computer-executable instructions stored thereon for operating a workflow management system that, when executed in one or more processors, are configured to execute operations comprising:
   configuring a workflow definition with a plurality of states and transitions;

generating a plurality of instances of a workflow engine during runtime of the workflow management system;

generating at least one queue of a queue service during runtime of the workflow management system;

dynamically adjusting the number of instances of the workflow engine and the number of queues of the queue service based on a change in a number of workflow processes executing within the workflow management system;

for individual tasks in a workflow process, by an instance of the workflow engine:

retrieving a task from a queue of the queue service, wherein the task has task data including a primary key associated with a unique process of the number of workflow processes;

sending a query request to a non-relational database based at least in part on the primary key;

receiving a process data from the non-relational database, wherein the process data contains data relating to the unique process;

executing the task based on the task data, the process data, and a current state of the unique process independent of an execution history of the unique process;

based, at least in part, on the execution of the task, transitioning from the current state of the process to a new state of the process; and updating the process data from the non-relational database to include the new operating state of the process and remove operating state data associated with the executed task.

16. The computer-readable medium of claim 15, wherein the task is a stateless task.

17. The computer-readable medium of claim 15 further comprising determining whether the state of the unique process is a final state of execution.

18. The computer-readable medium of claim 15, wherein the task is to transition from the current state in the workflow definition to a new state in the workflow definition.

19. The computer-readable medium of claim 15, wherein the task is for the workflow engine to execute an action.

20. The method of claim 1, wherein each instance of the workflow engine is not dedicated to a specific workflow process.

* * * * *